Aug. 7, 1951  B. L. BRITT  2,563,153

PORTABLE DYNAMOMETER BRAKE

Filed Nov. 29, 1944  4 Sheets-Sheet 1

INVENTOR.
BRYANT L. BRITT
BY
ATTORNEY.

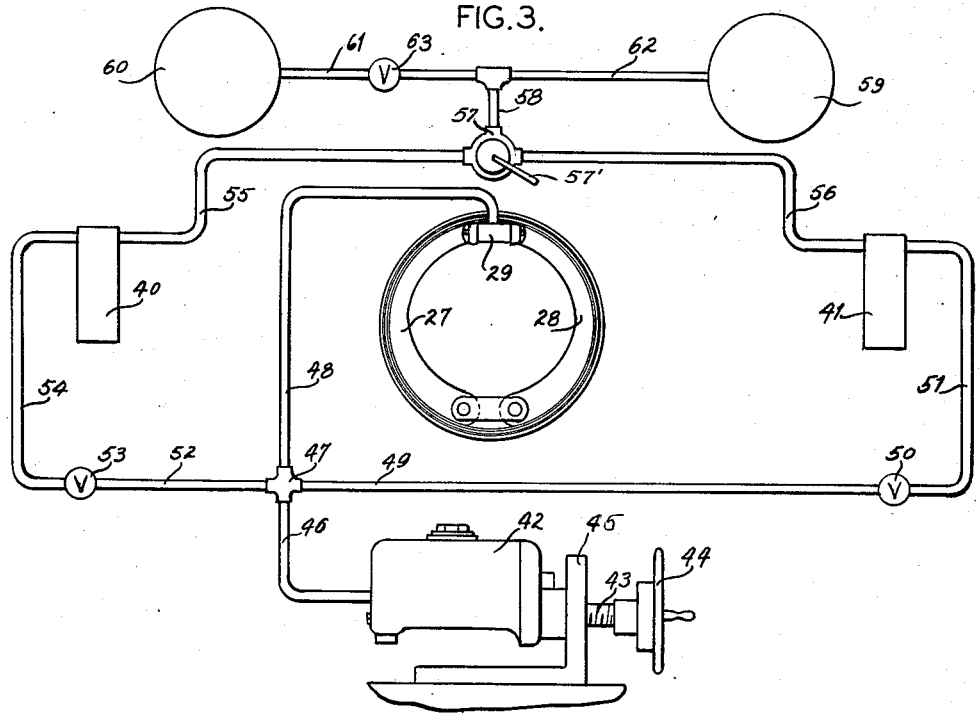
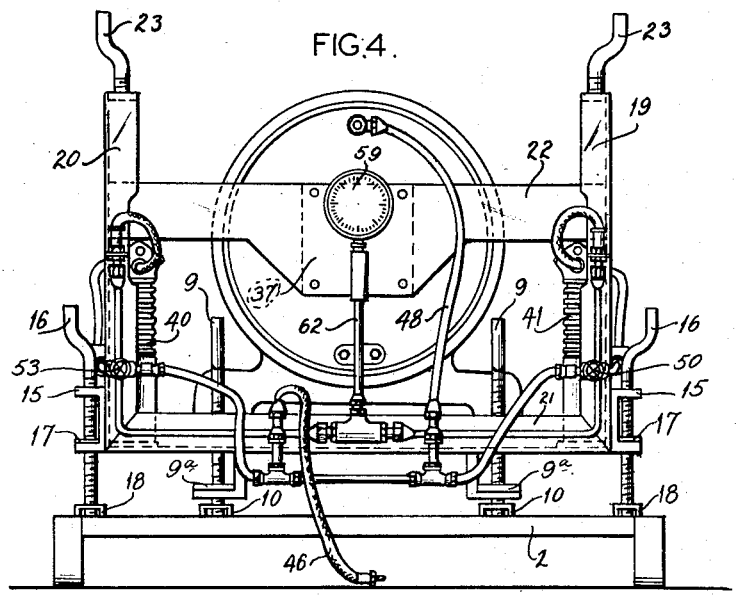

Aug. 7, 1951     B. L. BRITT     2,563,153
PORTABLE DYNAMOMETER BRAKE
Filed Nov. 29, 1944     4 Sheets-Sheet 3
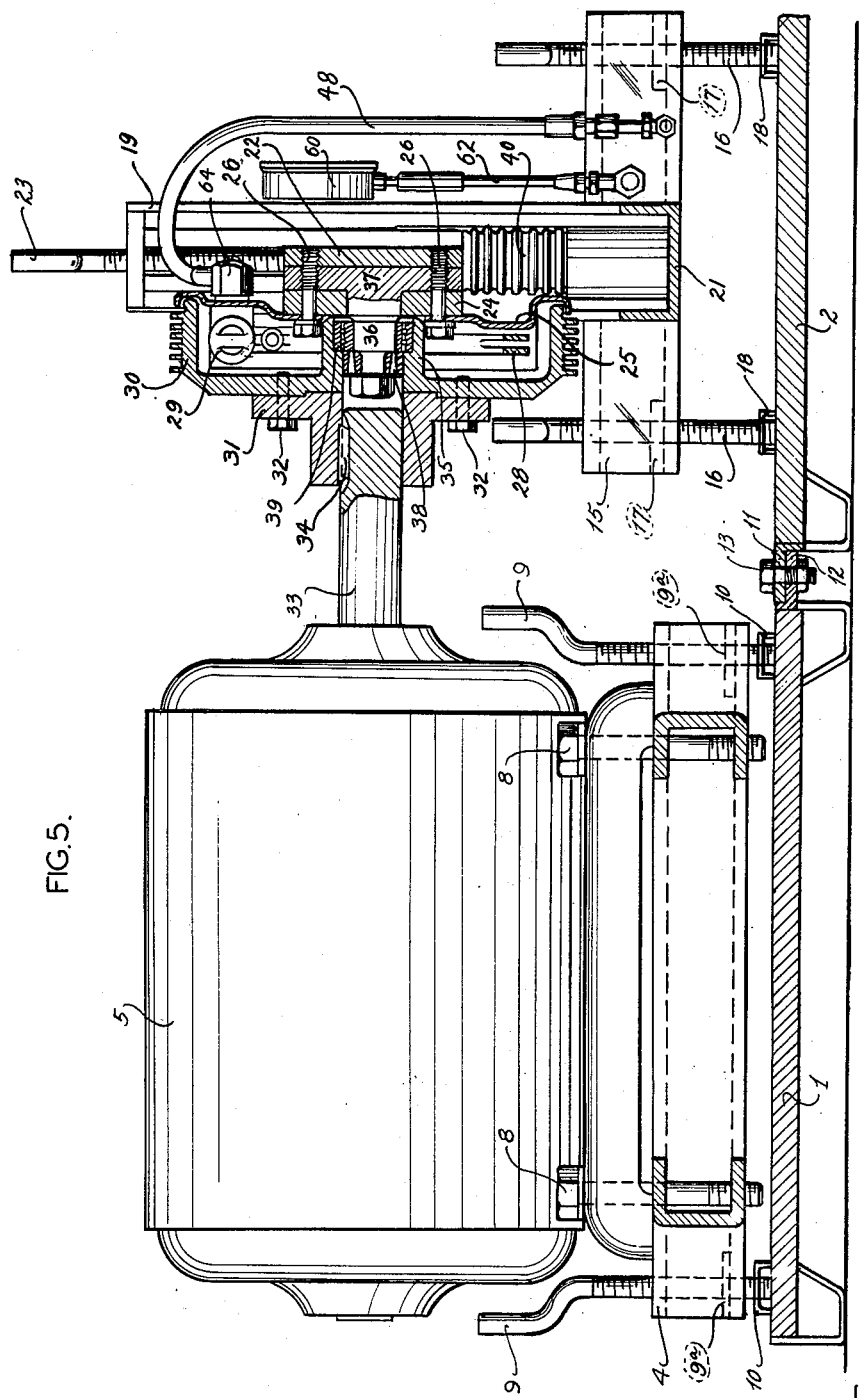
FIG. 5.
INVENTOR.
BRYANT L. BRITT
ATTORNEY.

Aug. 7, 1951          B. L. BRITT          2,563,153
PORTABLE DYNAMOMETER BRAKE

Filed Nov. 29, 1944          4 Sheets-Sheet 4

INVENTOR:
BRYANT. L. BRITT

BY    ATTORNEY

Patented Aug. 7, 1951

2,563,153

UNITED STATES PATENT OFFICE 2,563,153

PORTABLE DYNAMOMETER BRAKE

Bryant L. Britt, Maplewood, Mo., assignor to Wagner Electric Corporation, St. Louis, Mo., a corporation of Delaware Application November 29, 1944, Serial No. 565,735

7 Claims. (Cl. 73—134)

This invention relates to dynamometers and in its more specific aspects is directed to a portable dynamometer which is readily employable to test the horsepower output of motors ranging from a very small size up to a very large horsepower output.

One of the objects of the invention is to provide a portable dynamometer that may be readily attached to and detached from an electric motor without the necessity of placing it in a special test stand.

Another object of the invention is to provide a dynamometer brake which may be readily applied to and detached from a motor without arranging the latter on a stationary test stand.

A further object of the invention is to provide a portable Prony brake which is a part of a portable motor testing equipment that is readily attachable to a motor resting on an ordinary manufacturer's transport.

Another and still further object of the invention is to produce a portable dynamometer provided with a plurality of adjustments that enable it to be easily centered with respect to the armature shaft of the motor under test.

A still further object of the invention is to provide a portable Prony brake for portable motor testing equipment in which the brake shoes are hydraulically applied to a brake drum readily attachable to and detachable from the armature shaft of the motor under test.

Another and still further object of the invention is to provide a portable testing device for an electric motor that may be readily attached to and detached therefrom without moving the motor to any predetermined or specified position.

Another and still further object of the invention is to provide a portable testing device for an electric motor having means incorporated therein for readily centering the brake assembly with respect to the motor under test and which provides a direct reading gage incorporated in a hydraulic system for measuring the torque developed by the motor under test.

Other and further objects of the invention will occur to those skilled in the arts to which this application pertains as the description proceeds, which, taken in connection with the accompanying drawings, sets forth a preferred embodiment of the invention and a selected modification thereof but such disclosures are not to be construed as a limitation of the invention which is limited only by the appended claims and any and all modifications, alterations and variations of structure coming within the spirit and scope thereof are deemed to be included herein.

In the drawings:

Figure 3 is a schematic hydraulic layout of the essential apparatus employed in the portable dynamometer;

Figure 4 is a front elevational view thereof;

Figure 5 is a view taken substantially along the line 5—5 of Figure 1;

Figure 1:
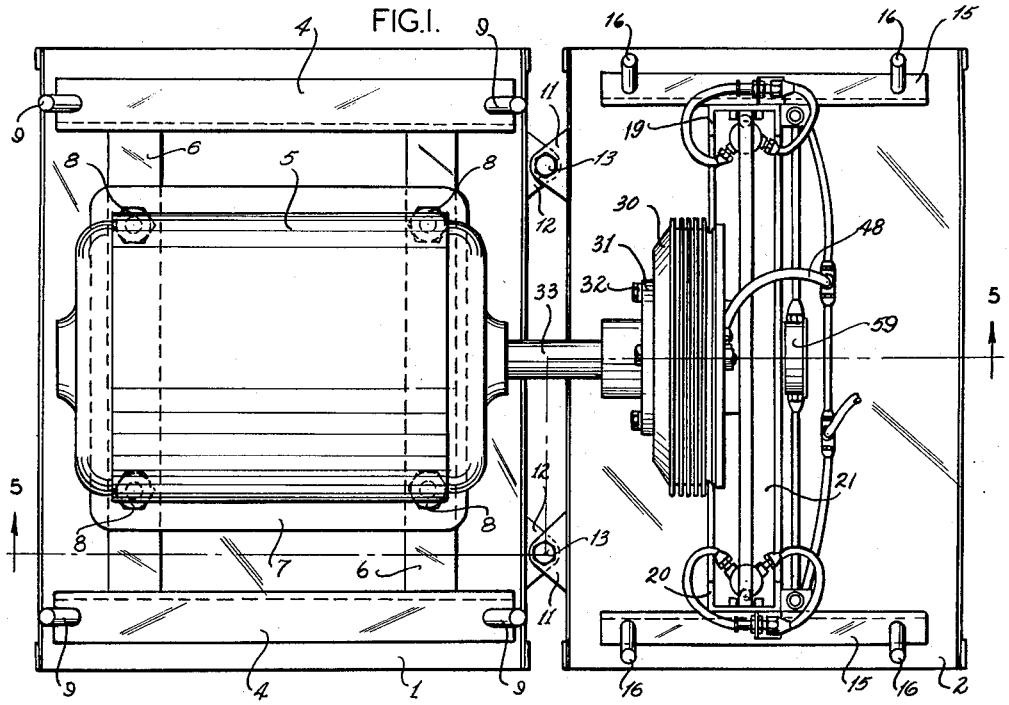
Figure 1 is a plan view of the portable dynamometer.
Figure 2:
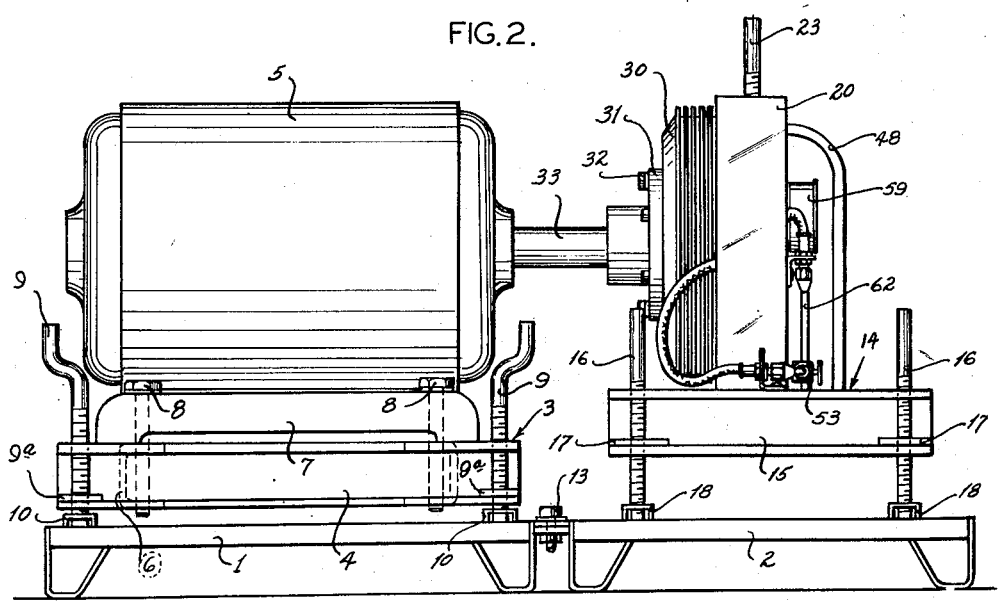
Figure 2 is a side elevational view thereof.

Commercial practice for measuring the horsepower output of fractional and larger sized motors has in the past been generally performed on stationary testing devices which incorporate a Prony brake or a motor generator set, the motor under test being the one driving the testing generator. This method of testing has always required the moving and setting up of the motor or engine under test in the particular apparatus provided therefor and necessitated the handling of the motor under test at least twice to perform one test. This has involved a considerable amount of labor and lost motion and requires the employment of various types of blocking in order to bring the shaft of the prime mover and the test brake or the testing generator into alignment. Another disadvantage to be considered in the prior art is the fact that test generators or brakes set up on stationary dynamometers have been too large for the smaller type of motor and if one is designed for a small motor, it was not readily adaptable to one of a larger size. The objections to commercial practice now pursued are overcome in the instant disclosures which provide a portable device that is movable up to the motor instead of moving the motor up to it and by the simple expedient of controlling the pressures or changing the size or dimensions of the brake unit or by substituting a different brake assembly which can be employed with either a relatively large or a comparatively small motor. In the event of necessity, means on the device provide for a quick adjustment to substitute different brake assemblies, when necessary, for the one installed so that the size of the brake will be proportioned and in keeping with the motor or engine undergoing test.

The objects and advantages outlined above are obtained in a device set forth in the accompanying drawings in which 1 is a manufacturer's transport stand ordinarily quite generally found in manufacturing establishments for moving goods from one section or department of a factory to another. Numeral 2 refers to a similar stand on which the brake assembly subsequently described is arranged. The transport stand 1 is intended to support a motor or engine under test and a vertically adjustable supporting base 3 is provided thereon. The provision of the supporting base is optional on the part of an operator and, when used, provides an additional adjustment to increase the flexibility of the testing device. The supporting base comprises a pair of frame elements 4, 4 extending substantially parallel to the axis of the motor 5 under test and it is provided with a pair of transverse or crossmembers 6, 6 on which the base 7 of motor 5 is secured by means of a plurality of screw elements 8, 8 threaded into members 6, 6. Arranged in the members 4, 4 are adjusting screws 9 which are threaded therein and into nuts 9a welded to the members 4, 4. The lower ends of the screws may be rotatably received in a plurality of brackets 10, 10 in order to secure the same to the transport member 1 to prevent relative movement of the base 3 with respect to the transport element 1. The adjusting screws 9, 9 are also used for leveling the motor 5 with respect to the supporting surface as well as providing for a vertical adjustment.

The transport stand 2 has a pair of ears 11, 11 thereon which cooperate with similar ear elements 12, 12 on transport stand 1, each of which is provided with suitable axially alignable apertures in which bolt elements 13, 13 are inserted in order that the two transports may be locked together during the period of test. The primary object of providing the ear and bolt elements on the transports is to prevent any possible whipping or rotation of one of the transports with respect to the other and thereby maintain the same in a more stable condition.

The transport 2 has supported thereon a frame member 14 supporting the brake assembly which comprises a pair of channel or other appropriately shaped bar members 15, 15 having a plurality of adjusting screws 16, 16 in each, the adjusting screws being preferably limited to two in each bar member. Each of these adjusting screws is threadably received in the appropriate apertures formed in members 15, 15 provided with nut elements 17, 17 also threaded to the screws. The nut elements are preferably welded or otherwise secured to the channel members to prevent possible relative movement thereof with respect to the bar members 15, 15. In order to maintain the adjusting screws 16, 16 fixed to the transport 2 to prevent relative movement thereof, it has arranged thereon a plurality of brackets 18, 18 equal in number to the number of screws. The adjusting elements 9, 9 and 16, 16 are so shaped at their ends that they will rotate within the respective brackets 10 and 18. This construction prevents the movment of frame 14 with respect to the transport during any period of test. The frame 14 is operable without mounting on transport 2 but its maneuverability is facilitated when so mounted.

The frame 14 is further provided with a pair of uprights 19 and 20 secured to a transverse member 21. The members 19, 20 and 21 are secured together as a single unit illustrated more particularly in Figure 4 which is welded or otherwise secured to members 15, 15 extending in the same direction as members 4, 4 previously discussed. Rotatably movable within the uprights 19 and 20 is a member 22 functioning as a torque arm which is secured to the backing plate of a brake assembly. The rotation of arm 22 is materially limited in the frame elements 19, 20 and 21 by means of screws 23, 23 in order to aid in stabilizing the structure during movement from one station to another. It is, therefore, evident that the brake assembly supported on arm 22 can be adjusted with respect to the motor by means of screws 16, 16 to align the two and that screws 23, 23 limit the rotation of the torque arm 22 to confine same to a substantially horizontal position in addition to the function previously set forth. These screws during periods of idleness clamp the torque arm against pressure fluid devices subsequently described. During operation the torque arm must be freely movable in frame members 19 and 20 and are withdrawn therefrom a short distance.

Referring now to Figure 5, there is disclosed a sectional view of the brake assembly in which the backing plate 25 is shown secured to member 22 previously discussed by means of a plurality of screws 26, 26 with a reinforcing plate 24 disposed immediately adjacent backing plate 25. Mounted on the backing plate 25 is a pair of brake shoes 27 and 28 which may be either pivoted to the backing plate itself or pivoted together as shown in Figure 3. A pressure fluid motor or brake cylinder 29 is likewise fixed to the backing plate having a pair of pistons (not shown) therein operating in the usual manner and engaging the ends of the brake shoes to expand the same into engagement with the brake drum 30. The brake drum 30 has an adapter or connector element 31 secured thereto by means of a plurality of screws 32, 32 with the adapter element keyed to the armature shaft 33 of motor 5 by key 34, the particular connection being employed because it facilitates quick removal from and attachment to the armature shaft.

The backing plate 25 and its associated structures are journaled on the drum 30 so as to provide for centering the one upon the other which is accomplished by integrally associating with the drum an inwardly extended flange or boss 35 that cooperates with the bearing pin 36 which in this instance is secured to member 22 with plate 24 disposed between the bearing pin flange 37 and backing plate 25. The particular mode of journaling, as illustrated, provides the element 35 of the brake drum 30 with appropriate counterbores in order to receive anti-friction bearings 38 and 39 which may be conventional in character, the inner races of the bearings received on differentially diametered pin 36. The illustration shows the assembly as having two separate bearing members but it is not necessarily limited to this particular bearing organization, the only essential feature being that it is necessary to provide some means for freely journaling the drum 30 on the backing plate 25.

Disposed within and secured to element 21 at each end thereof are piston cylinder devices 40 and 41, said devices being suitably secured to the ends of member 21. It is evident, therefore, that when the brake shoes 27 and 28 are applied to the brake drum by pressure fluid, the backing plate and its associated torque arm will tend to rotate with the brake drum. However, one of the ends of torque arm 22 will be in engagement with one or the other of the piston elements of members 40 or 41 depending upon the direction of rotation of motor 5, which will then cause drum 30 and backing plate 25 to rotate relatively to each other. The entire brake assembly during test is rotatable with the motor armature until the rotation of the backing plate is stopped by the torque arm engaging one of the elements of devices 40 and 41 which absorb the torque developed by the motor 5 as transmitted thereto through the brake shoes 27 and 28 in contact with drum 30 and thence through backing plate 25 and torque arm 22. By placing the axis of rotation of shaft 33 and drum 30 a distance such as one foot from the center or point of contact of arm 22 with the motor devices 40 and 41, it is evident that any pressure readings on the gage measuring the pressure developed in one or the other of the piston cylinder devices 40 or 41 will give a direct reading of the torque developed by the motor under test and any ordinary gage will, therefore, read the torque in foot pounds. This is a convenient method of obtaining the results although the distance between the center of axis rotation of the drum and the point of application of elements 22 to either of the piston cylinder devices 40 or 41 can be read directly on any type of gage providing it is calibrated in terms of foot pounds of torque as applied to the particular length of torque arm 22.

Pressure fluid may be applied to the brakes from a conventional compensating master cylinder 42 which is provided with a lead screw 43 having a hand wheel 44 attached thereto. The provision of the hand wheel 44 and the lead screw 43 will enable a very fine incremental or decremental adjustment of the pressures to be applied to the brake shoes 27 and 28 by means of brake cylinder or motor 29.

A suitable bracket 45 is provided on a convenient base or may be carried, if so desired, on one of the frame members 15, 15 within easy view of the gage to be subsequently described. The compensating master cylinder 42 has connected thereto a conduit 46 leading to a four-way fitting 47. Another conduit 48 leads to the brake cylinder or motor 29 to supply pressure thereto. Arranged in another one of the outlets of the four way fitting 47 is a conduit 49 having a cut-off valve 50 therein and the valve 50 is connected to the piston cylinder device 41 by means of a conduit 51. The fourth outlet of the four-way fitting 47 has a conduit 52 connected thereto leading to a cut-off valve 53 and the valve is connected to piston cylinder device 40 by means of a conduit 54. In order to determine the pressures existing in the several conduits, the piston cylinder devices 40 and 41 have conduits 55 and 56, respectively, connected thereto which terminate in a three-way or cross-over valve fitting 57. The fitting 57 includes a two-way valve having an operating handle 57' for directing the flow of fluid from either conduit 55 or 56 into conduit 58 while preventing the flow of fluid between the other conduit and conduit 58. The common side of fitting 57 has a conduit 58 secured thereto and in the schematic diagram there is shown a pair of gages 59 and 60 connected to conduit 58 by means of conduits 61 and 62, there being a shut-off valve 63 arranged in conduit 61. The reason for showing two gages 59 and 60 is that one may be employed for measuring comparatively high pressures and the other for reading comparatively low pressures with valve 63 being closed when comparatively high pressures are to be measured in order to prevent damage to the meter or gage 60 which is normally intended to measure low pressures. The conduit organization in Figures 1, 2, 4, and 5 varies slightly from that in Figure 3 for the reason that the circuit has been simplified in Figure 3 but its operation is the same as in Figures 1, 2, 4, and 5.

During operation the compensating master cylinder 42 is actuated which will apply the brake shoes to the brake drum and will constitute a load on the motor 5 under test. The amount of load to be applied will be fully determined by means of the pressure that is applied and the torque to be developed will be determined by the force that the torque arm 22 applies to either of the piston cylinder devices 40 or 41. Since only one of these piston cylinder devices 40 and 41 is employed for any given direction of rotation, valve 50 or 53 is to be closed depending upon which of the aforesaid piston cylinder devices is employed. As the pressure on the brake shoes is increased or decreased, it is obvious that the load will be increased or decreased and, therefore, the pressure to be applied to the piston cylinder devices 40 and 41 will likewise be increased or decreased which is in direct proportion to the torque developed by the motor. The gages 59 and 60 are directly associated with the respective piston cylinder devices 40 and 41 and since the torque developed by the motor will change with the load applied thereto, it is evident that the pressures developed by member 22 acting against either one of the piston cylinder devices 40 and 41 will alter the reading on the meters or gages 59 and 60 to inform the operator of the power output of the motor under test. Shaft 33 in reality supports the brake assembly during operation such that torque developed could be measured directly. Screw 23 confines the movement of arms 22 at all times.

A suitable fixture 64 is secured to the backing plate and connects with the brake cylinder motor 29 in order to connect the conduit 48 thereto. The valves 50, 53 and 63 may be conventional in character whereby the pressure fluid is directed to either of the piston cylinder devices 40 or 41.

The piston cylinder devices 40, 41 are employable as a vertical adjusting means for the torque arm 22 and the attached brake assembly after the loosening of screws 23, 23. When hand wheel 44 of compensating master cylinder 42 is rotated pressure fluid can be forced into devices 40, 41 when valves 50 and 53 are open. The pressure fluid forced from the compensating master cylinder will move the piston devices upward, thereby lifting or vertically adjusting the torque arm 22 assembly. This procedure produces a very fine adjustment because screw 43 must axially travel a considerable distance in order to move arm 22 vertically an appreciable distance, thereby effecting a much finer adjustment than is possible with screws 16, 16 whenever this is necessary. After the vertical adjustment of the assembly has been completed the valves 50 and 53 are closed before the motor is placed on test. The closing of valves 50 and 53 isolates the measuring system from the fluid supply system and thus allows a true reading of the pressure produced in the cylinder 40 or 41 to be indicated by the gage.

It should be evident from the foregoing description that a portable means has been provided which may be readily secured to the motor to be tested which need not be mounted on a testing stand but may be tested at any point which is convenient to a source of power and because of the particular construction gages 59 and 60 may be read directly in foot pounds of torque or the gages may be calibrated to read in foot pounds when the distance between the point of torque arm 22 and either of brake cylinders 40 or 41 is of a dimension other than one foot.

Figure 6:
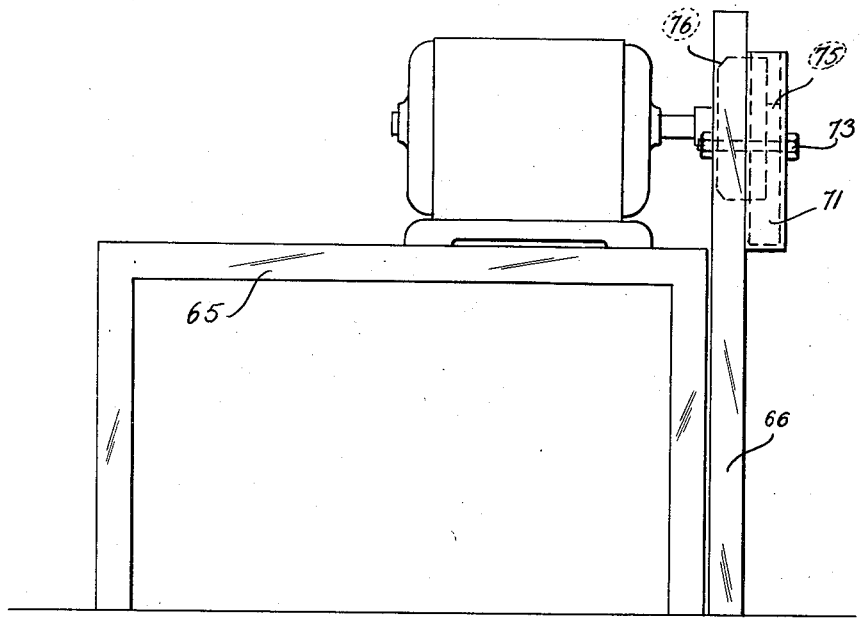
Figure 6 is a side elevational view of a modified form of the invention.
Figure 7:
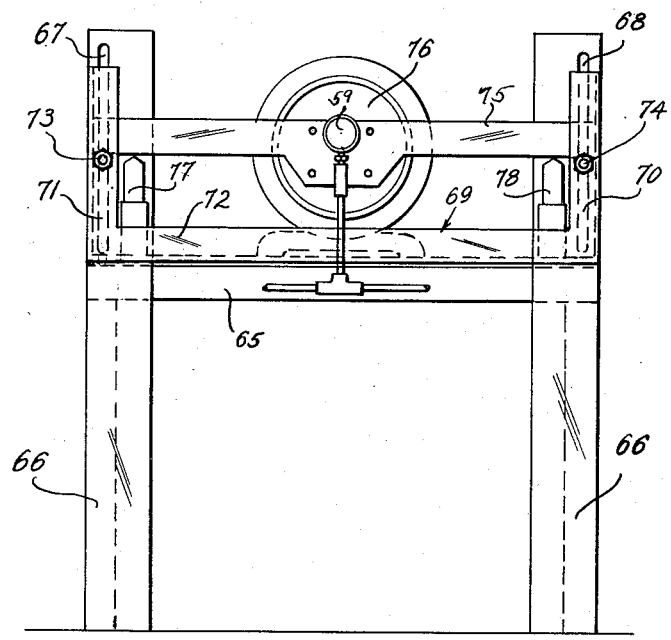
Figure 7 is a front elevational view thereof.

A modification of the foregoing structure is set forth in Figures 6 and 7. This modification is directed to a means for using the combined torque arm and brake assembly set forth above in a bench-type mechanism particularly adapted for use in testing small or fractional horsepower motors. These figures show a bench 65 of the table-type commonly found in industrial establishments. Secured to one end of the bench is a pair of uprights 66 having slots 67 and 68 formed therein, one in each upright. These uprights are securable to the bench in any suitably manner and for practical purposes can be considered a part thereof.

A frame member 69 is constructed similarly to the frame member shown in the above disclosure which comprises elements 19, 20 and 21 and is herein shown comprising the vertical elements 70 and 71 secured to or integral with the horizontal element 72.

Bolts 73 and 74 are inserted through slots 67 and 68 in uprights 66 and are intended to normally clamp the frame 69 to said uprights 66. The torque arm 75 and its brake assembly 76 are identical in construction with the corresponding element 22, 25, and 30 and its associated shoes 27 and 28 and brake cylinder 29 described above. Arranged at each end of element 72 are piston cylinder devices 77 and 78 which may be identical in construction with piston cylinder devices 40 and 41. The parts, such as the compensator, control valves, gages, et cetera, disclosed in detail in Figure 3 and structurally shown in Figures 1, 2, 4 and 5 are identical with those employed in the modification shown in Figures 6 and 7. In view of the fact that small or fractional horsepower motors are easily handled when arranged on benches similar to 65, it is more convenient to move the motor to the testing device than to move the testing device to the motor as is done in the preferred embodiment of the invention.

The rough adjustments of the torque arm 75 and brake assembly 76 are made by loosening bolts 73 and 74 and manually bringing the brake assembly in substantial alignment with the armature shaft of a motor 79 that is under test and any finer adjustments which may be necessary to bring the axes of the brake drum 76 and the motor shaft into alignment are made by actuating the compensator as explained above, thereby effecting an unusually fine vertical adjustment. By means of the device shown in Figures 6 and 7 a rapid testing of motors may be accomplished and the method of vertical adjustment set forth above employing the piston cylinder devices 40 and 41 is much more effective for the instant purpose than adjusting screws 16 which are intended for larger and heavier pieces of equipment that must be adjusted such as employed in connection with larger motors.

Because of the simplicity of adjustment and the portability of the device it is employable not only as a factory or production testing device but may be as easily and readily employed in small motor or generator repair shops or in other commercial establishments that want to obtain a quick test of the power output or the efficiency of the motor without moving it to some distant stationary testing stand.

Having fully described my invention, that which I claim as novel and desire to protect by Letters Patent of the United States is:

1. In a Prony brake device for testing a motor, a support; means for vertically adjusting said support; an upright frame held on said support; a pair of pressure fluid devices in said frame, one disposed in each end thereof; a brake assembly including a brake drum secured to the motor being tested, a backing plate, means journaling said drum on said backing plate and brake shoes mounted on said backing plate engageable with said drum; a torque arm secured to said backing plate whose ends are normally supported on said pressure fluid devices; means for causing varying pressure to be applied by said brake shoes to said drum, said assembly when employed during a testing operation supported on the shaft of said motor under test such that said pressure fluid devices will absorb the torque developed; and gage means associated with said pressure fluid devices for directly reading the developed torque.

2. In a portable motor testing device, means for supporting a brake assembly, said assembly including a brake drum securable to a motor to be tested, a backing plate, a torque arm secured to said backing plate, and brake shoes on said backing plate; a pair of pressure fluid devices in said means, one device disposed on one side of said drum and the other device disposed on the opposite side of said drum, said torque arm selectively engageable with each of said devices; means for applying said brake shoes to said drum; means for measuring the torque produced by the motor under test; and means for vertically adjusting said brake assembly which includes screw elements in said first mentioned means for making major adjustments and said pair of pressure fluid devices acting through said torque arm vertically adjusting said brake assembly for fine adjustments.

3. In a motor testing device, a brake assembly comprising a brake drum, a backing plate, brake shoes on said backing plate, means journaling said drum on said backing plate and a brake cylinder for urging said shoes into engagement with said drum, said drum securable to a motor to be tested; a frame in which said brake assembly is received; a torque arm fixed to said backing plate; a pressure fluid device arranged on each side of said frame adapted to be selectively engaged by said torque arm depending upon the direction of rotation of the motor to be tested; gage means associated with said devices for measuring the torque applied to each of said devices; means for applying pressure fluid to said brake cylinder for loading the motor to be tested; and conduit means associating said devices with said last mentioned means for vertically adjusting said brake assembly for aligning it with the motor to be tested.

4. In a testing device for a motor having an extended armature shaft, a brake assembly; means for supporting said brake assembly; pressure fluid operated means on said supporting means for vertically adjusting said brake assembly with respect to said motor in order to align said assembly with respect to the extended motor shaft, said brake assembly including a drum, a backing plate and a brake shoe thereon; a brake cylinder for applying said brake shoe to said drum; means for measuring the torque developed by the motor which includes a torque arm secured to said backing plate engageable with said pressure fluid operated means; a gage associated with said pressure fluid means; and means for applying pressure fluid to said brake cylinder for increasing the load on said drum and motor in definite increments.

5. In a motor testing device, a brake assembly comprising a brake drum, a backing plate, brake shoe means on said backing plate, means for journaling said drum on said backing plate, and a brake cylinder for moving said shoe means into engagement with said drum, said drum securable to the motor to be tested; a frame in which said brake assembly is received; a torque arm fixed to said backing plate; a pressure fluid device arranged on each side of said frame adapted to be selectively engaged by said torque arm, depending upon the direction of rotation of the motor being tested; a single gage means associated with said pressure fluid devices for measuring the torque applied to each of said devices; means for applying pressure fluid to said brake cylinder for loading the motor being tested; conduit means associating said devices with said last mentioned means for enabling said brake assembly to be vertically adjusted for alignment with the motor being tested; and valve means between said single gage and said pressure fluid devices for causing said gage to indicate the pressure exerted by said torque arm on either of said pressure fluid devices while sealing off the other of said pressure fluid devices.

6. In a motor device; a support; means for vertically adjusting said support with respect to a motor to be tested; a brake assembly; a frame on said support, said brake assembly normally supported in said frame, said brake assembly including a brake drum securable to the motor to be tested; a backing plate and brake shoes on said backing plate, said drum journaled on said backing plate; a torque arm secured to said backing plate whose ends are received in said frame on diametrically opposite sides of said assembly; pressure fluid means in said frame engageable by the ends of said torque arm; means for applying said brake shoes to said drum; means associated with said pressure fluid means for measuring the force applied thereto by said torque arm; and means for normally holding said torque arm in said frame and adjustable for allowing said torque arm to rotate relatively to said frame a limited amount during operation of the testing device.

7. In a portable motor testing device; means for supporting a motor being tested; means for vertically adjusting said motor with respect to said support; a brake assembly; means for supporting said brake assembly; means for connecting said motor supporting means and said brake assembly supporting means, said brake assembly including a drum securable to the shaft of said motor; a backing plate having a brake shoe thereon engageable with said drum; a torque arm secured to said backing plate; fluid pressure operated means for measuring the torque developed by said motor delivered to said fluid pressure operated means for measuring through said torque arm; means for vertically adjusting said brake assembly which includes screw devices for making major adjustments and said fluid pressure operated means for making minor adjustments, said fluid pressure operated means engaging said torque arm employable as vertical adjusting means; and means for applying said brake shoe to said drum in definite increments of brake shoe pressure.

BRYANT L. BRITT.

REFERENCES CITED

The following references are of record in the file of this patent:

UNITED STATES PATENTS

| Number | Name | Date |
| --- | --- | --- |
| 1,418,655 | Klemmer | June 6, 1922 |
| 1,445,923 | Wilder | Feb. 20, 1923 |
| 1,452,905 | Beehler | Apr. 24, 1923 |
| 1,642,095 | Tracy | Sept. 13, 1927 |
| 1,777,423 | Zeder | Oct. 7, 1930 |
| 2,321,652 | Carliss | June 15, 1943 |
| 2,372,420 | Garrett | Mar. 27, 1945 |
| 2,405,060 | Scofield | July 30, 1946 |